Oct. 19, 1954
G. M. THOMAS
2,692,167
BRAKE CYLINDER PRESSURE CONTROL APPARATUS
Filed Aug. 10, 1951
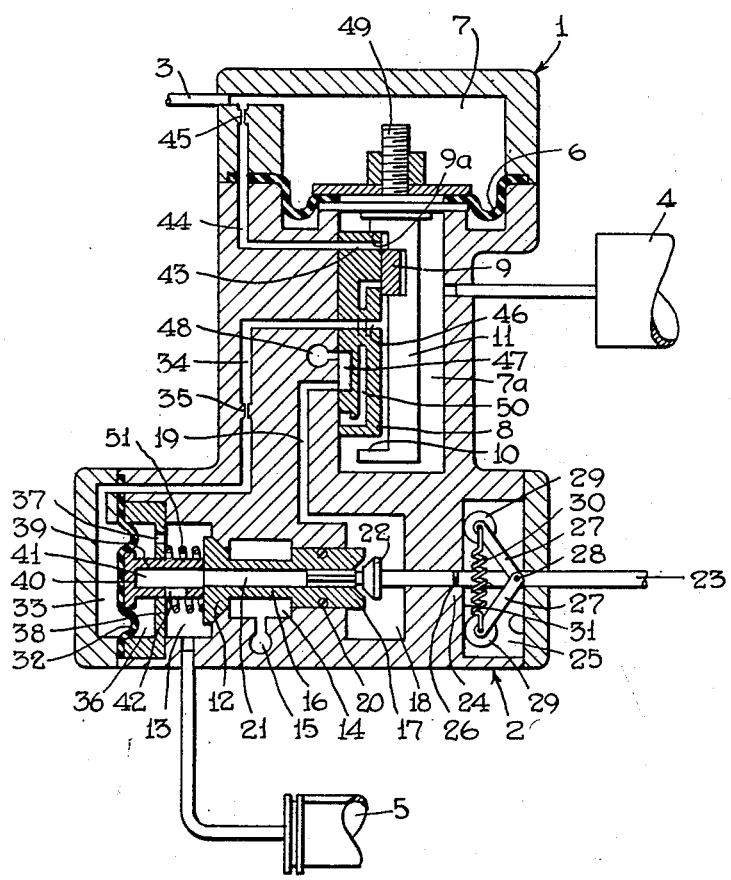
INVENTOR.
Glenn M. Thomas
BY
Adelbert A. Steinmiller
ATTORNEY Patented Oct. 19, 1954

2,692,167

UNITED STATES PATENT OFFICE 2,692,167

BRAKE CYLINDER PRESSURE CONTROL APPARATUS

Glenn M. Thomas, Dravosburg, Pa., assignor to Westinghouse Air Brake Company, Wilmerding, Pa., a corporation of Pennsylvania Application August 10, 1951, Serial No. 241,225

1 Claim. (Cl. 303—68)

This invention relates to fluid pressure brake apparatus and more particularly to manually operative means for releasing fluid under pressure from and supplying fluid under pressure to a brake cylinder device.

In the pending application of Earle S. Cook, Serial No. 238,918, filed July 27, 1951, there is disclosed a brake controlling valve device which is operative upon a reduction in pressure of fluid in a brake pipe to supply fluid under pressure from a source to a brake cylinder device for applying the brakes on a vehicle. A manually operative release and reapplication valve device controls communication through which the fluid under pressure is supplied to the brake cylinder device and with the brake pipe vented, said valve device is operative manually to either close said communication and vent the brake cylinder device so as to release the brakes on the vehicle without loss of fluid under pressure from the source, or to close the vent to the brake cylinder device and reopen said communication to permit fluid under pressure from the source to again flow to the brake cylinder device to apply the brakes. Upon recharging of the brake pipe with fluid under pressure, the valve device is automatically reset to close the brake cylinder vent and reopen the communication from the brake controlling valve device to the brake cylinder device, in case a trainman should leave the valve device in the position venting the brake cylinder device, for thereby ensuring that the brakes on the vehicle will apply when the engineer subsequently desires such to occur.

For thus automatically resetting the valve device, a flexible diaphragm is subject to brake pipe pressure in a chamber open to the brake pipe and operative thereby upon recharging of the brake pipe to effect such resetting. When the pressure of fluid in the brake pipe is reduced to a relatively low degree, as upon an emergency reduction in pressure therein, the diaphragm is rendered ineffective on the valve device to permit manual operation of said valve means, as above described.

It is undesirable to, in effect, increase the volume of the brake pipe on a vehicle by opening a chamber, such as just mentioned, to the brake pipe for such added volume will act to slow down the transmission of quick service and quick emergency action through the brake pipe on a train of vehicles. Moreover, it might be desirable to be able to operate the manually operative release and reapplication valve device to release and reapply brakes on a vehicle, for testing purposes, with the brake pipe still charged with fluid up to substantially that present at the end of effecting a full service application of brakes.

The principal object of the invention is therefore the provision of an improved manually operative release and reapplication valve device which may be operated to release and reapply brakes on a vehicle with the brake pipe charged with fluid at substantially the pressure which exists upon a full service reduction in brake pipe pressure and which does not undesirably add volume to the usual brake pipe on a vehicle.

Other objects and advantages will become apparent from the following more detailed description of the invention.

In the accompanying drawing, the single figure is a diagrammatic view of a fluid pressure brake apparatus embodying the invention.

Description

As shown in the drawing, the brake apparatus comprises a brake controlling valve device 1 including a manually operative brake release and reapplication valve device 2, a brake pipe 3, an auxiliary reservoir 4 and a brake cylinder device 5.

For the purpose of illustration, the brake controlling valve device 1 may comprise a flexible diaphragm 6 at one side of which is a chamber 7 open to brake pipe 3 while at the opposite side is a chamber 7a open to the auxiliary reservoir 4. A main slide valve 8 and an auxiliary slide valve 9 are contained in valve chamber 7, the main slide valve being mounted to slide on a seat in the casing of the device and being disposed between two spaced apart shoulders 9a, 10 on a stem 11 connected at one end to diaphragm 6 for movement therewith. The auxiliary slide valve 9 is mounted to slide on the main slide valve 8 and is disposed in a recess in stem 11 for movement with said stem.

The manually operative release and reapplication valve device 2 comprises a valve 12 contained in a chamber 13 which is open to the brake cylinder device 5 and is operative to control communication between said chamber and brake cylinder device, and a chamber 14 which is open to atmosphere through an atmospheric passage or vent 15. The valve 12 is connected to one end of a stem 16 extending through chamber 14 and its opposite end is connected to a plunger 17 slidably mounted in a bore in a partition wall separating chamber 14 from a chamber 18, the chamber 18 being connected via passage 19 to the seat of the main slide valve 8.

A sealing ring 20 carried by plunger 17 has sliding contact with the wall of the casing bore to prevent leakage of fluid under pressure from chamber 18 to chamber 14 and thence atmosphere via passage 15.

A bore 21 extends axially through valve 12, stem 16 and plunger 17, being open at one end to chamber 13 and opening at the opposite end through a valve seat provided on the end of plunger 17 to chamber 18, a valve 22 in chamber 18 being provided to cooperate with said seat to close communication between chamber 18 and bore 21. A spring 51 in chamber 13 acts on valve 12 urging it to its seat.

The valve 22 is connected to one end of a manually operative rod 23 extending through a bore in a partition wall 24 and a chamber 25 to the exterior of the device for operation by a trainman. A sealing ring 26 carried by the rod has sealing contact with the wall of the bore in partition wall 24 to prevent leakage of fluid under pressure along said rod from chamber 18. In chamber 24 two oppositely extending toggle arms 27 have their adjacent ends connected by a pin 28 to rod 23. In the opposite end of each arm is a roller 29, the opposite ends of the two arms being connected together by a spring 30 which is under tension. Chamber 25 has two opposite and parallel arranged end walls 31 for contact by the rollers 29. With the rollers 29 in contact with the inner wall 31, it will be seen that spring 30 will urge the rod 23 outwardly of the casing to a position defined by the adjacent ends of arms 27 engaging the outer wall 31, said rod thereby unseating the valve 22 while permitting seating of valve 12 by spring 51. Upon manual movement of rod 23 inwardly of the casing, the pivot pin 28 will move to the side of the line of action of spring 30 opposite that in which it is shown in the drawing, whereupon spring 30 will move rollers 29 into contact with the outer end wall 31 and urge rod 23 inwardly until the adjacent ends of arms 27 engage the inner end wall 31, this operation seating valve 22 and through said valve actuating plunger 17 to unseat valve 12 against spring 51.

The numeral 32 designates a flexible diaphragm arranged in coaxial relation to and spaced from the valve 12. At one side of diaphragm 32 is a chamber 33 open through a passage 34 containing a choke 35 to the seat of the main slide valve 8. At the opposite side of diaphragm 32 is a chamber 36 open through a passage 37 in a partition wall 38 to chamber 13 which in effect constitutes a part of chamber 36. A plunger 39 slidably mounted in a bore through partition wall 38 has on one end a head 40 engaging the adjacent face of diaphragm 32 while the opposite end is arranged to engage valve 12 around the bore 21. The plunger 39 has a bore 41 adapted to register at the inner end of plunger 39 with the bore 21, the bore 41 being constantly open to chamber 13 through a port 42 extending radially through said plunger.

*Operation*

In operation, when fluid under pressure is initially supplied to the brake pipe 3, in the usual manner, such fluid will flow into diaphragm chamber 7 and therein act on diaphragm 6 to deflect same to move the slide valves 8, 9 to their usual release position in which valve chamber 7a and thereby the auxiliary reservoir 4 will be open past the upper end of the auxiliary slide valve 9 to a port 43 extending through the main slide valve 8 and registering at the seat of said main slide valve with a passage 44 which is open through a passage 44 containing a charging choke 45 to the brake pipe 3. Through the communication just described, the valve chamber 7a and auxiliary reservoir 4 will become charged with fluid at the pressure in brake pipe 3 in the usual manner.

In the release position of the main slide valve 8, a port 46 therein, which is constantly open to valve chamber 7a, registers with passage 34 so that fluid at the pressure in said chamber and the auxiliary reservoir 4 will become effective in chamber 33 wherein it will act on diaphragm 32 to deflect same toward the right hand. If the valve 12 is open and valve 22 closed at this time, the deflection of diaphragm 32 will move plunger 39 into contact with valve 12 to seat valve 12 and during seating of valve 12 will move valve 22 and rod 23 to a position in which the line of action of spring 30 is at the right hand side of pin 28 so that said spring will unseat the valve 22.

With valve 22 open, the brake cylinder 5 will be open through chamber 13, port 42 and bore 41 in plunger 39, bore 21 in valve 12, stem 16 and plunger 17 to chamber 18 and thence to atmosphere through passage 19, a cavity 47 in the main slide valve 8 and an atmospheric port 48.

With the brake pipe 3 and auxiliary reservoir 4 thus fully charged with fluid under pressure and the brake cylinder device 5 vented, if it is desired to effect an application of brakes, the pressure of fluid in brake pipe 3 will be reduced in the usual manner at a rate exceeding the capacity of charging choke 45 to permit auxiliary reservoir pressure in valve chamber 7a to reduce by back flow to said brake pipe. When the brake pipe pressure in chamber 7 is thus reduced slightly below auxiliary reservoir pressure in chamber 7a acting on the opposite side of diaphragm 6, said diaphragm will deflect upward until an extension 49 of stem 11 engages the casing. During such movement of stem 11, the auxiliary slide valve 9 will first be moved relative to the main slide valve 8 until shoulder 10 on stem 11 engages the main slide valve 8 and then said main slide valve will move with said stem. The movement of the auxiliary slide valve 9 relative to the main slide valve 11 will lap port 43 so as to close communication from the auxiliary reservoir 4 to the brake pipe 3 to prevent back flow of fluid under pressure from the auxiliary reservoir to the brake pipe and will also open one end of a service port 50 to valve chamber 7a, while subsequent movement of the main slide valve 8 will move port 43 therein out of registry with the auxiliary reservoir charging passage 44, and move cavity 47 out of registry with passage 19 and into registry with passage 34 and also move the service port 50 into registry with passage 19. Fluid under pressure from the auxiliary reservoir 4 and valve chamber 7a will then flow through passage 19 to chamber 18, past the open valve 22 therein to bore 21 and thence through bore 41, passage 42 and chamber 13 to the brake cylinder device 5 to apply brakes on a vehicle.

The opening of passage 34 to atmosphere via cavity 47 in slide valve 8 and the atmospheric port 48, at substantially the same time as fluid under pressure is supplied to passage 19 to apply the brakes on the vehicle, releases fluid under pressure from the diaphragm chamber 33, thereby relieving pressure of said diaphragm on the valve 12. The pressure of spring 51 on valve 12 is adapted to hold said valve seated however against build up of pressure in chamber 18 as fluid under pressure is supplied via said chamber to chamber 13 and the brake cylinder device until pressure in chamber 13 becomes effective to aid said spring to hold said valve seated.

If less than a full service reduction in pressure in brake pipe 3 is effected, then when the auxiliary reservoir pressure in valve chamber 7a becomes reduced by flow to the brake cylinder device 5 to a degree slightly lower than the opposing brake pipe pressure acting in chamber 7 on diaphragm 6, said diaphragm will deflect downward to a lap position in which the stem shoulder 9a will engage the main slide valve 8 to stop such movement. This movement will however move the auxiliary slide valve 9 relative to the main slide valve 8 and lap the service port 50 so as to prevent further flow of fluid under pressure from the auxiliary reservoir 4 to the brake cylinder device 5 for thereby limiting the pressure in the brake cylinder device in accordance with the degree of reduction in pressure in the brake pipe.

If a full service or greater reduction in brake pipe pressure is effected, then the pressure of fluid in the auxiliary reservoir 4 will equalize in the brake cylinder device 5 at the same pressure as will be present in the brake pipe 3 at the end of a full service reduction in pressure therein whereby the diaphragm 6 and auxiliary slide valve 9 will remain in their uppermost or service position in which the auxiliary reservoir 4 will remain open to the brake cylinder passage 19.

With the auxiliary reservoir 4 thus open to the brake cylinder passage 19 with the brake pipe charged to any pressure up to that remaining therein at the end of a full service reduction in brake pipe pressure, and with diaphragm chamber 33 open to atmosphere via cavity 47 in slide valve 8 and port 48, brake cylinder pressure in chamber 36 will deflect diaphragm 32 toward the left hand and remove pressure of plunger 39 on valve 12 as above mentioned.

With the brakes on the vehicle thus applied and valve 12 relieved of pressure from diaphragm 32, if a trainman should desire to release the brakes on the vehicle without dissipating the fluid under pressure still remaining in the auxiliary reservoir 4, he will push rod 23 into the casing of the device to seat valve 22 and then open valve 12. The seating of valve 22 closes communication between the auxiliary reservoir 4 and brake cylinder device 5 while the opening of valve 12 will release fluid under pressure from the brake cylinder device 5 for thereby releasing the brakes on the vehicle without releasing the fluid under pressure remaining in the auxiliary reservoir 4.

If after the brakes are thus released on the vehicle, the operator desires to reapply the brakes, he will pull rod 23 out of the casing to open valve 22 and permit closure of valve 12 by spring 51 whereupon pressure of fluid remaining in the auxiliary reservoir 4 will equalize into the brake cylinder device 5 to reapply the vehicle brakes.

In this manner, after the brakes on the vehicle have been applied upon a reduction in pressure in brake pipe 3, the application may be released, and then the brakes may be reapplied, by manual operation of the release and reapplication valve device 2 as long as sufficient pressure remains in the auxiliary reservoir 4 to cause an application, such operation being intended only for inspection or adjusting purposes or for renewal of brake shoes when the vehicle is still.

Even with only a partial application of brakes in effect, at which time the parts of the brake controlling valve device 1 will be in lap position, and the diaphragm chamber 33 vented, a trainman may by operation of the release and reapplication valve device 2 release the partial application of brakes, if such be desired. The brakes can not be reapplied by operation of the valve device 2 under this condition however since the service port 50 is lapped by the auxiliary slide valve 9 closing communication between the auxiliary reservoir 4 and passage 19.

Upon recharging the brake pipe 3 with fluid under pressure subsequent to having reduced such pressure to effect an application of brakes, the diaphragm 6 will return the slide valves 9, 8 to their normal position in which the auxiliary reservoir 4 will be recharged with fluid under pressure from the brake pipe 3, the brake cylinder passage 19 will be reopened to atmosphere via cavity 47 in the main slide valve 8 and port 46 in said main slide valve will again register with passage 34 to permit fluid under pressure to be supplied from the auxiliary reservoir 4 to diaphragm chamber 33.

If the brake cylinder device 5 is charged with fluid under pressure at the time the parts of the brake controlling valve device 1 are returned to normal position and the parts of the release and application valve device 2 are in their normal position, in which they are shown in the drawing, then the fluid under pressure will be released from said brake cylinder device via passage 19, cavity 47 in the main slide valve 8 and passage 48.

If while the brake controlling valve device was in service application position or lap position, the brake cylinder device 5 had been vented by operation of the release and application valve device 2 and the valve 12 was still open and valve 22 closed, then at the time the main slide valve 8 is returned to release position in response to an increase in pressure in brake pipe 3, the fluid under pressure supplied from the auxiliary reservoir 4 to diaphragm chamber 33 will actuate said diaphragm to close valve 12 and open valve 22 to ensure that the brakes will be applied upon a subsequent reduction in pressure in brake pipe 3.

The choke 35, it will be noted, limits the rate of supply of fluid under pressure from the auxiliary reservoir 4 to diaphragm chamber 33 and thereby the rate of increase in pressure therein when the main slide valve 8 is returned to release position in which passage 19 is vented. The purpose of this is to so delay the consequent increase in pressure in chamber 33 as to prevent obtaining sufficient pressure on diaphragm 32 to seat valve 12 and unseat valve 22 against the pressure of the toggle spring 30, before pressure of fluid which may be in passage 19 and chamber 18 is reduced substantially to atmospheric pressure. Otherwise upon opening of valve 22 with chamber 18 and passage 19 charged with fluid under pressure, such pressure equalizing into the brake cylinder device 5 might produce such a pressure therein as to cause movement of the brake cylinder piston (not shown) which might injure a person if, for example, he was renewing brake shoes on the vehicle and was not aware that the brake pipe was being recharged with fluid under pressure.

*Summary*

It will now be seen that I have provided an arrangement including a manually operative release and reapplication valve device whereby after the brakes on a vehicle are applied by a full service or any greater reduction in pressure in brake pipe 3, the brakes may be manually released without dissipating the fluid under pressure remaining in the auxiliary reservoir which may be employed for manually effecting another application of brakes, if such be desired. Upon recharging of the brake pipe with fluid under pressure, the manually operative release and reapplication valve device will be automatically reset to ensure brake application upon a subsequent reduction in pressure in the brake pipe.

Having now described my invention, what I claim as new and desire to secure by Letters Patent is:

In a fluid pressure brake apparatus, in combination, a brake pipe, an auxiliary reservoir, fluid pressure operable brake applying means, brake control means controlled by opposing pressures of fluid in said brake pipe and reservoir and having the usual release position for releasing fluid under pressure from said brake applying means and service position for supplying fluid under pressure from said reservoir to said brake applying means, one valve controlling communication between said brake applying means and a vent, bias means for urging said valve to a position for closing said communication, a second valve controlling communication between said brake control means and brake applying means and operative upon closing such communication to operate said one valve to open the communication controlled thereby, manually operative means for actuating said other valve to its communication opening and closing positions, a movable abutment open at one side to a chamber and operative upon supply of fluid under pressure to said chamber to close said one valve and upon relief of fluid under pressure from said chamber to permit opening of said one valve by said other valve, toggle means acting on said other valve for biasing same to actuate said one valve to its open position and for biasing said other valve to its open position upon seating of said one valve, said brake control means comprising means for supplying fluid under pressure to said chamber in said release position and for venting said chamber upon movement out of said release position.

References Cited in the file of this patent

UNITED STATES PATENTS

| Number | Name | Date |
|---|---|---|
| 2,293,778 | Sudduth | Apr. 25, 1942 |
| 2,490,997 | Cook | Dec. 13, 1949 |